Sept. 1, 1936.                A. SEARLES ET AL                2,052,900
                                  CONVEYER
                        Filed April 24, 1935            2 Sheets-Sheet 1

INVENTORS.
AMOS SEARLES
CHARLES A. SWARTZ
BY
Moses & Nolte
ATTORNEYS

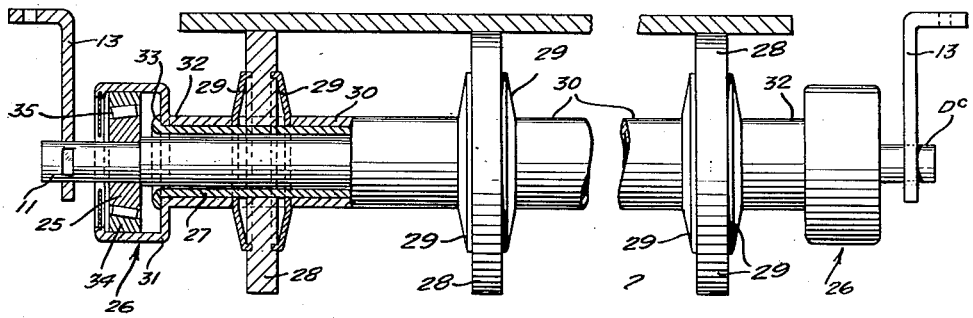
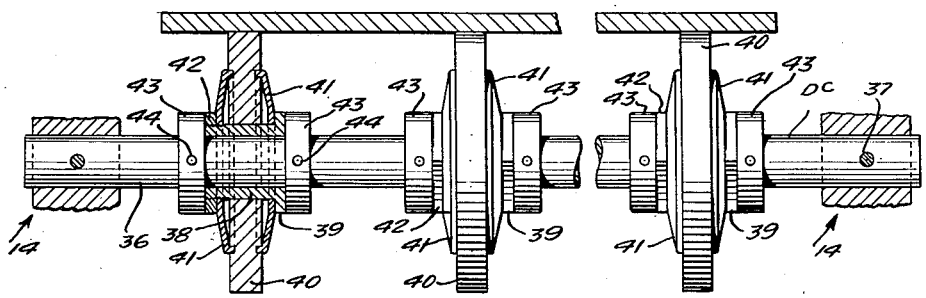
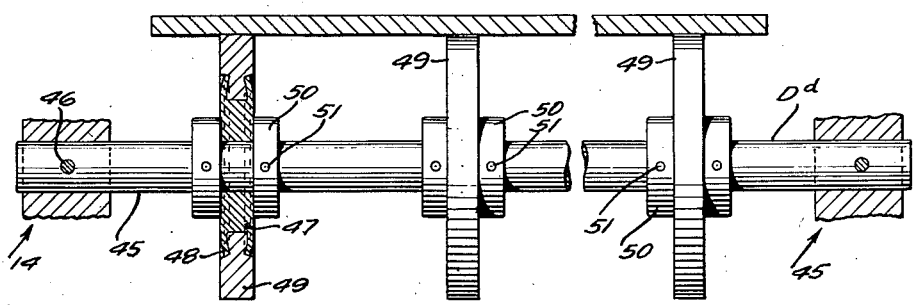

Patented Sept. 1, 1936

2,052,900

UNITED STATES PATENT OFFICE 2,052,900

CONVEYER

Amos Searles, Moscow, Pa., and Charles A. Swartz, Bronxville, N. Y.

Application April 24, 1935, Serial No. 17,896

12 Claims. (Cl. 198—192)

This invention relates to conveyers, and more particularly to conveyers of the class wherein an endless belt is employed for carrying material in lump, granular or powdered form. The invention has a particular applicability to conveyers whose use involves exposure to the elements.

An important feature of the invention has to do with the provision of means for supporting the return or idle stretch of the conveyer belt in a manner which overcomes certain drawbacks and disadvantages which have inhered in prior art structures. To this end the idle stretch of the belt is supported at intervals by series of narrow rollers, the rollers of each series being aligned transversely of the belt and spaced substantially from one another widthwise of the belt. The rollers have their peripheries formed of a soft deformable material such as rubber.

The fact that the supporting rollers are narrow and are substantially separated from one another widthwise of the belt has important advantages. Solid or continuous rollers as used in the past have the disadvantage that fines and ice adhere to them, building up convex surfaces on the rollers. This causes the belt to tend to slide off to one side or the other. The edge of the belt consequently runs up against one side frame or the other and is subjected to wear.

To avoid this wear, brushers or scrapers are used in some installations to clean the belt. But these scrapers wear the belt and also wear themselves and have to be replaced.

The widely spaced narrow rollers of the present invention have the advantage that they form clear tracks on the surface of the belt which serve to keep the belt in line, so that it will not run off to either side.

Moreover longitudinal troughs tend to form between the rollers, the belt being flexed downward between each two adjacent rollers. In passing around the end rollers of the conveyer the belt is flexed about the axis of the end rollers. This alternate transverse and longitudinal flexure is very effective in breaking any ice and dislodging any fines adhering to the belt and causing them to fall away from the belt. Brushers or scrapers, therefore, become unnecessary and the life of the belt is thus materially extended.

Furthermore it is possible for the fines to drop down into the space between the narrow rollers instead of building up on the rollers as they do when solid or continuous rollers are employed. As a consequence they do not cause wear either of the idler rollers or of the belt.

The rollers are constructed to prevent the formation and retention of ice upon them. The rollers have their marginal portions, at least, made of deformable material. The deformable rollers are mashed down progressively around their peripheries as the successive portions come in to belt engaging position. When a portion leaves contact with the belt and is relieved of the belt weight it resumes its original form, and this intermittent compression and expansion is effective to break up and eliminate any ice film which may form.

In accordance with a further feature of the invention rollers of the same type as already referred to are desirably employed for supporting the active stretch of the belt. Rollers of the kind described have advantages when employed for this purpose. They are capable, as already pointed out, of keeping themselves free from ice. They also subject the belt to less wear than continuous rollers of the kind heretofore employed. This is true both because they are of soft material, and because any fines which work around the edges of the belt and into engagement with the outermost rollers are thrown off by the rollers and not merely carried round and round and ground into the belt. The rubber rollers are also non-corrosive. Solid or continuous cylindrical rollers employed on the load carrying side tend to wear into concave shape, this causes wear on the edge of the belt. The disc rollers of the present invention avoid both of these effects.

Moreover, because of the cushioning effect of the resilient edge of the supporting rollers and because of the resiliency or flexing of the belt between the rollers, heavy or sharp pieces which fall on the belt at the loading end will cause less wear or damage to the belt than the solid cylindrical metal rollers of the present day.

Other objects and advantages will hereinafter appear.

In the drawings forming part of this specification,

Figures 4, 5 and 6 are figures similar to Figure 3, each showing a different type of roller construction and mounting.

Figure 1:
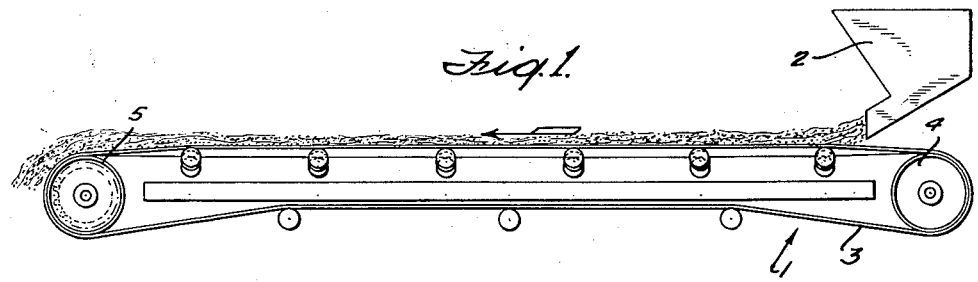
Figure 1 is a view in side elevation of a conveyer embodying features of the invention.
Figure 2:
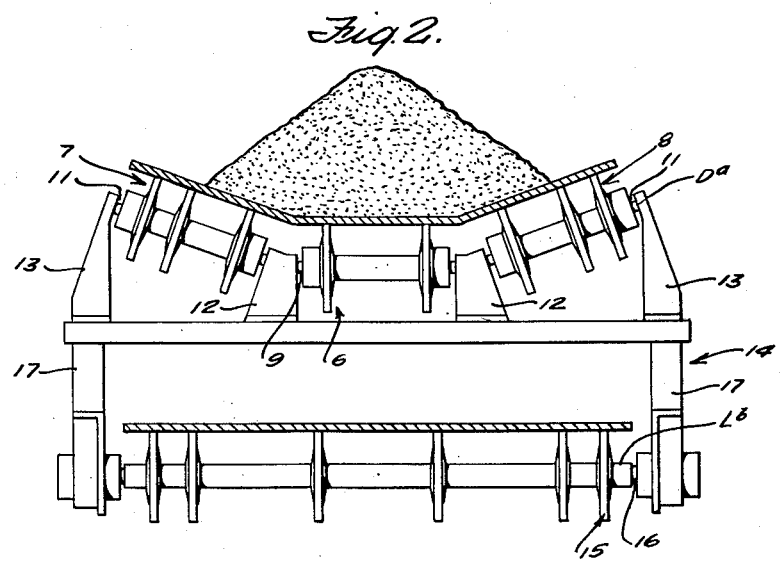
Figure 2 is a sectional view in end elevation of the conveyer of Figure 1.

In Figures 1 and 2 disclosure is made of a conveyer which embodies features of the invention. Material to be transported may be deposited on the receiving end of the conveyer by any suitable means, as by gravity discharge from a bin or chute 2. The conveyer comprises an endless belt 3 of leather, rubberized fabric or other suitable material. The belt runs in the direction indicated by the arrow and travels around end rollers 4 and 5, the latter at least being driven. The upper or active stretch of the belt is supported in trough shape as shown in Figure 2 by sets 6 of narrow rollers which revolve about horizontal axes and sets 7 and 8 of narrow rollers which revolve about inclined axes. The roller sets 6, 7 and 8 are supported on shafts 9 and 11, respectively, which are mounted in brackets 12 and 13 of the frame 14 of the structure.

The inactive or lower stretch of the conveyer belt is supported upon sets 15 of narrow rollers which are widely spaced. The rollers of each set 15 are carried by a shaft 16 which is mounted in frame members 17.

Figure 3:
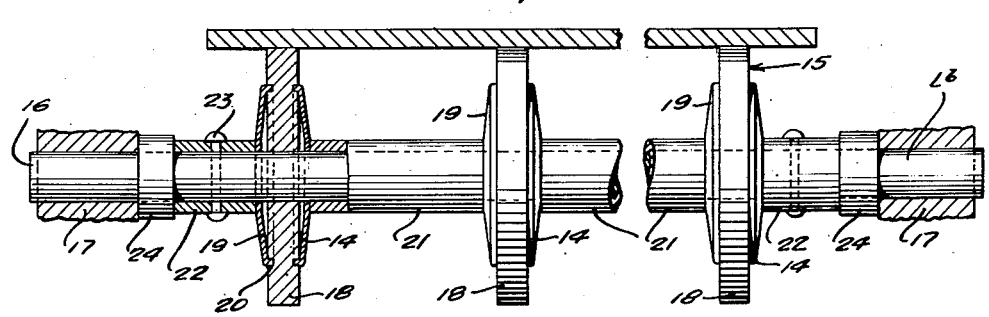
Figure 3 is a sectional, detail view illustrating one form of roller construction and mounting which may be employed to advantage in Figure 1.

In Figure 3 disclosure is made of one form of construction suitable for utilization in supporting the idle stretch of the belt. In this construction provision is made of a shaft 16 journalled in the frame members 17. This shaft has rubber rollers 18 mounted at intervals upon it. Spring discs 19 having marginal flanges 20 are mounted upon the shaft at opposite sides of each roller with the flanges turned toward the roller to press into the roller material and grip it firmly. The discs 19 are made concave so that they stand out of contact with the central portion of the rollers 18. Spacer sleeves 21 are mounted upon the shaft 16 and interposed between the discs of adjacent rollers. Sleeves 22 are mounted upon the shafts outside the outer rollers of the series and are secured to the shaft by pins 23. The sleeves 22 are so mounted that the discs 19 are all held under compression and afford firm support for the marginal portions of the deformable rollers 18. Bearing collars 24 are mounted upon the shaft between the sleeves 22 and the frame members 17. The shaft 16 is adapted to be driven for driving the rollers 18, but it may be employed as an idler shaft if preferred. The construction just described may also be employed in the upper series of rollers 6, 7 and 8.

In Figure 4 a modified arrangement of rollers is shown, this arrangement being the one which is illustrated as incorporated in the upper series of rollers of Figure 2. The frame members 13 support a shaft 11 which carries hub members 25 of roller bearings 26. A sleeve or tube 27 surrounds the shaft 11 but does not engage it. Rubber rollers 28 are mounted upon the sleeve and are held between discs 29, similar to the discs 19 of Figure 3. Spacer sleeves 30 are interposed between the discs of adjacent rollers. Bearing cage or housing members 31 have sleeve portions 32 which surround the sleeve 27 to bear against the outer discs 29 of the outer rollers. The sleeve 27 has its ends 33 upset against internal shoulders of the cage members so that the sleeves 32 and 30 and the roller discs 29 are all held tightly together in compressed relation. Each cage member 31 carries the outer bearing member 34 of one of the roller bearings. Each bearing member 34 runs through interposed rollers 35 upon the associated inner bearing or hub member 25 carried by the shaft 11. The rollers 28 run in unison because they are all fixed to the sleeve 27 but the composite structure is not driven except through frictional engagement with the conveyer belt.

In Figure 5 a further embodiment is illustrated which may be utilized in supporting either the upper or lower stretch of the conveyer. A shaft 36 is fixed in the frame 14 by means of pins 37. Hub members 38 having flanges 39 at one end and external threads at the other are rotatably mounted at intervals upon shaft 30. Rubber rollers 40 are mounted upon the hubs 38 between metallic discs 41, similar to the discs 19 of Figure 3. A nut 42 is threaded onto the threaded end of the hub 38 so that the discs 41 and the interposed roller 40 are clamped between the nut 42 and the flange 39. Each hub member is fixed in place upon the shaft between collars 43 which are secured to the shaft by pins 44. The shaft 36 does not rotate, but the hubs are free to rotate individually relative to the shaft.

A further embodiment is disclosed in Figure 6. A shaft 45 is fixed in the frame 14 by means of pins 46. Roller hubs 47 are rotatably mounted at intervals upon the shaft. Each hub 47 comprises spaced peripheral flanges 48 which form a peripheral channel between them. Rubber rollers 49 are mounted upon the hubs so as to be received in the channels. The flanges 48 are then displaced inward toward one another to grip the inner margins of the rollers 49 firmly between them. When the flanges are thus displaced the channel is caused to assume a dovetail form. The hubs 47 are fixed longitudinally of the shaft by means of collars 50 secured to the shaft by pins 51. The shaft 45 is not driven, but the rollers are free to rotate individually relative to the shaft.

We have described what we believe to be the best embodiments of our invention. We do not wish, however, to be confined to the embodiments shown, but what we desire to cover by Letters Patent is set forth in the appended claims.

We claim:

1. In a conveyer, in combination, an endless flexible belt having an active upper stretch and an idle lower stretch, end rollers upon which the belt runs, and means for supporting at least one of said stretches between the end rollers comprising multiple series of transversely aligned narrow rollers spaced apart lengthwise of the belt and between which series the belt is otherwise unsupported, the rollers of each series being spaced apart from each other laterally of the belt and each roller being individually so narrow that the support of the belt is effected by narrowly localized contacts with said rolls, permitting flexure of said belt transversely and lengthwise between said regions of contacts.

2. In a conveyer, in combination, an endless flexible belt having an active upper stretch and an idle lower stretch, end rollers upon which the belt runs, and means for supporting the stretches between the end rollers comprising multiple series of narrow rollers, the rollers in each series having spaced apart in alignment with each other transversely of the belt and said plural series being spaced apart from each other lengthwise of the belt, the rollers having squashable peripheral elements of resilient material.

3. In a conveyer, in combination, an endless flexible belt having an active upper stretch and an idle lower stretch, end rollers upon which the belt runs, and means for supporting the lower stretch between the end rollers comprising a series of transversely aligned narrow rollers, the supporting rollers of a series being spaced from one another laterally of the belt sufficiently to permit transverse flexure of the belt between them, the rollers having deformable peripheral portions of non-corrosive material, the narrow region of contact of each roller exerting a kneading action on a contiguous localized region of the belt, and being itself squashed radially to a substantial extent, whereby accretions on both the belt and on the rollers are dislodged.

4. A roller for use in a conveyer of the class including an endless flexible belt having an active upper stretch and an idle lower stretch, end rollers upon which the belt runs, and means for supporting the lower stretch between the end rollers comprising multiple series of transversely aligned narrow rollers, said roller being formed with a squashable peripheral ring, and compressed resilient metallic discs clamping and supporting said ring near the periphery thereof.

5. A set of rollers for use in a conveyer of the class including an endless flexible belt having an active upper stretch and an idle lower stretch, end rollers upon which the belt runs, and means for supporting the belt between the end rollers comprising sets of narrow, yieldable rollers, said set comprising several rollers arranged transversely of the belt, and spaced apart by distances considerably greater than their individual width, a shaft for supporting said rollers, a pair of resilient metallic discs bearing in opposed relation against each roller, and compression members mounted upon the shaft for pressing the discs toward the rollers to clamp the rollers firmly and support them laterally.

6. A set of rollers for use in a conveyer of the class including an endless flexible belt having an active upper stretch and an idle lower stretch, end rollers upon which the belt runs, and means for supporting the belt between the end rollers comprising sets of narrow, yieldable rollers, said set comprising several rollers arranged transversely of the belt, and spaced apart by distances considerably greater than their individual width, a shaft for supporting said rollers, a pair of resilient metallic discs bearing in opposed relation against each roller, and compression members mounted upon the shaft for pressing the discs toward the rollers to clamp the rollers firmly and support them laterally, the compression members consisting of sleeves, and means securing the outer sleeves fixedly to the shaft.

7. A series of sets of rollers for use in a conveyer of the class including an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, and characterized by having several rollers spaced apart by distances considerably greater than their individual width, and each set being further characterized by a shaft for supporting the rollers of a set, a hollow tubular member surrounding the shaft and carrying the rollers, roller clamping members carried by the tubular member, and roll bearings separating the tubular member from the shaft.

8. A series of sets of rollers for use in a conveyer of the class including an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, and characterized by having several rollers spaced apart by distances considerably greater than their individual width, and each set being further characterized by a shaft for supporting the rollers of a set, a sleeve surrounding the shaft and carrying the rollers, clamping discs mounted on the sleeve, compression members mounted on the sleeve and pressing the discs into clamping relation to the rollers, and end bearings supporting the sleeve from the shaft.

9. A series of sets of rollers for use in a conveyer of the class including an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, and characterized by having several rollers spaced apart by distances considerably greater than their individual width, and each set being further characterized by a shaft for supporting the rollers of a set, a sleeve surrounding the shaft and carrying the rollers, clamping discs mounted on the sleeve for bearing against the sides of the rollers to clamp and laterally support the rollers, compression spacers mounted on the sleeve, the ends of the sleeve being upset to apply clamping pressure to the spacers, and coacting bearing members carried by the shaft and the outer spacers for rotatably supporting the sleeve from the shaft.

10. A series of sets of rollers for use in a conveyer of the class including an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, and characterized by having several rollers spaced apart by distances considerably greater than their individual width, and each set being further characterized by a shaft for supporting the rollers of a set, a hub for each roller mounted on the shaft and having a flange at one end and an external thread at the other end, concave resilient discs mounted on each hub and clamping the associated roller between them, a nut threaded on each hub for clamping the discs and the interposed roller between itself and the opposed hub flange, and means secured to the shaft for fixing positions of the hubs longitudinally of the shaft.

11. In a conveyer, in combination, an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, a shaft for supporting the rollers of a set, each roller comprising a hub disc having spaced peripheral flanges forming a channel between them, and an annulus of yielding material having its inner margin seated in the channel between the flanges and gripped by the flanges.

12. In a conveyer, in combination, an endless flexible belt having an active upper stretch and an idle lower stretch, end rollers upon which the belt runs, and means for supporting the belt between the end rollers comprising sets of narrow, yieldable rollers, the rollers of each set being arranged transversely of the belt, a shaft for supporting the rollers of a set, each roller comprising a hub disc rotatably mounted on the shaft and having spaced peripheral flanges defining a dovetail channel between them, and an annulus of yielding material having its inner margin seated in the channel between the flanges and gripped by the flanges.

AMOS SEARLES.
CHARLES A. SWARTZ.